United States Patent [19]
Hino et al.

[11] Patent Number: 5,251,272
[45] Date of Patent: Oct. 5, 1993

[54] IMAGE SIGNAL PROCESSING METHOD AND APPARATUS WITH CORRECTION FOR A SECONDARY LIGHT SOURCE EFFECT

[75] Inventors: Makoto Hino, Tokyo; Osamu Takase, Yokohama, both of Japan

[73] Assignee: Ricoh Company, Ltd., Tokyo, Japan

[21] Appl. No.: 724,165

[22] Filed: Jul. 1, 1991

[30] Foreign Application Priority Data

Jul. 2, 1990 [JP] Japan .................................. 2-174867
Jul. 2, 1990 [JP] Japan .................................. 2-174868
Apr. 16, 1991 [JP] Japan .................................. 3-084027

[51] Int. Cl.$^5$ .......................... G06K 9/40; H04N 1/40
[52] U.S. Cl. .................................... 382/54; 358/447; 358/463
[58] Field of Search ............. 358/445, 447, 463, 461; 382/54

[56] References Cited

U.S. PATENT DOCUMENTS

| | | | |
|---|---|---|---|
| 4,532,548 | 7/1985 | Zwirn | 358/166 |
| 4,783,839 | 11/1988 | Bamber | 382/54 |
| 5,065,444 | 11/1991 | Garber | 382/54 |
| 5,153,926 | 10/1992 | Jansson et al. | 382/54 |

FOREIGN PATENT DOCUMENTS

1-221976  9/1989  Japan .
1-267531  10/1989  Japan .

*Primary Examiner*—David K. Moore
*Assistant Examiner*—Andrew W. Johns
*Attorney, Agent, or Firm*—Oblon, Spivak, McClelland, Maier & Neustadt

[57] ABSTRACT

A method and an apparatus for processing an image signal generated in an image reading apparatus comprising a light source for illuminating a document, an optical system, and an optical detector for detecting a light which is reflected at a reading point on the document and passes through the optical system and for outputting an image signal corresponding to an amount of light detected thereby are disclosed. A secondary light source effect function which describes a degree that a light reflected at each point other than the reading point on the document affects the image signal corresponding to the reading point is obtained. The image signal output from the optical detector is corrected based on the secondary light source effect function and an image signal corresponding to each point so that a component corresponding to a light which is reflected at each point other than the reading point and affects the image signal corresponding to the reading point is eliminated from the image signal.

9 Claims, 7 Drawing Sheets

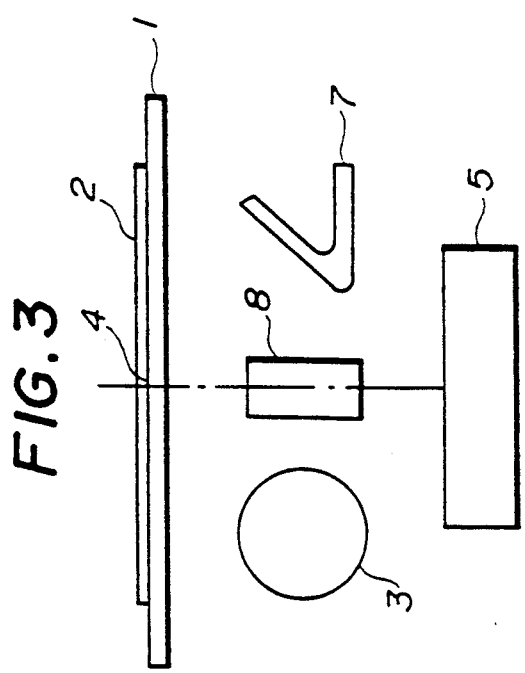
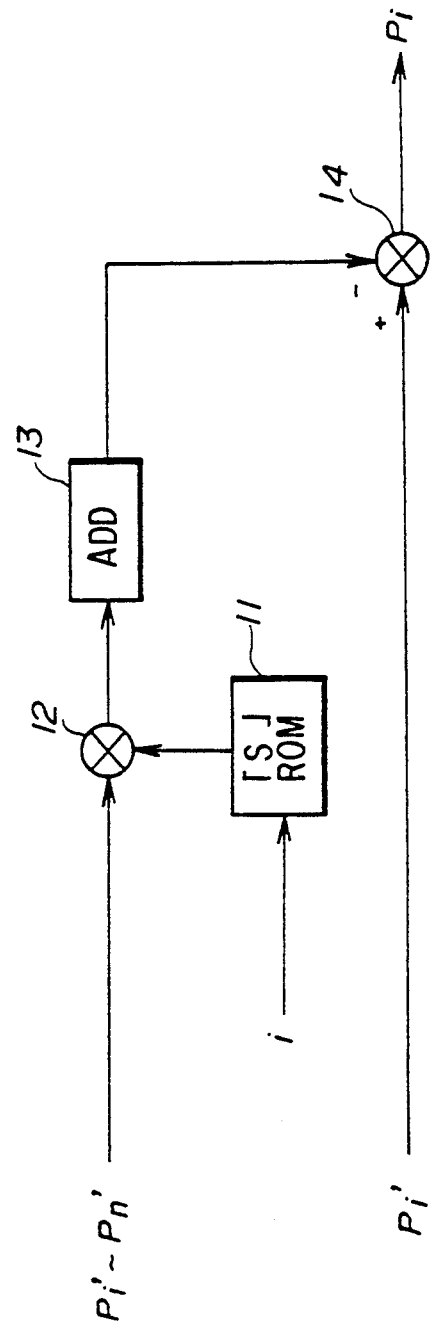

IMAGE SIGNAL PROCESSING METHOD AND APPARATUS WITH CORRECTION FOR A SECONDARY LIGHT SOURCE EFFECT

BACKGROUND OF THE INVENTION

The present invention generally relates to an image signal processing method and apparatus, and particularly to an image signal processing method and apparatus in which an image signal supplied from an optical sensor can be corrected.

In a general image scanner, a light source illuminates a wide region including a reading point on a document, a light reflected at the reading point being directly incident to an optical sensor of the image scanner. However, when the light source illuminates the wide region, a light which is reflected at a point other than the reading point on the document can be incident to the optical sensor via some parts of the image scanner. That is, each point other than the reading point on the document can be a second light source, so that an image signal output from the optical sensor is affected by a light from the second light source. A phenomenon in which the light deflected at each point other than the reading point on the document affects the image signal output from the optical sensor is referred to as a secondary light source effect. When the secondary light source effect is generated, an output characteristic of the image scanner deteriorates, and particularly a characteristic for representing gradation of an image remarkably deteriorates.

A description will now be given of a principle of the secondary light source effect in a conventional image reading apparatus with reference to FIGS. 1A and 1B. An image reading apparatus shown in FIGS. 1A and 1B scans a document in a line.

Referring to FIG. 1A, a document 2 is set on a supporting plate 1 which is transparent. The document 2 is illuminated via the supporting plate 1 by a light source 3. A light reflected at each reading point on a reading line 4 is incident to an image information detector 5. The reading line 4 extends in a direction perpendicular to the surface of a paper on which the drawing (FIG. 1A) is shown. The document 2 is scanned by the light source 3 and the image information detector 5 in a direction perpendicular to the reading line 4, so that the reading line 4 continuously moves and the image information corresponding to the whole document 2 is obtained by the image information detector 5.

In this image reading apparatus, an image can be read only on the reading line 4. However, under a condition in which the light source 3 illuminates a point 6 other than the reading point on the reading line 4, when the point 6 on the document 2 is white, a light which is reflected by the point 6 can travel via a construction member 7 to the image information detector 5, as shown by a dashed line in FIG. 1A. In addition, the light reflected at the point 6 on the document 2 is incident to the light source 3, and then the light reflected by a reflector of the light source 3 can also be projected onto the reading line 4 again. When the light reflected by the point 6 other than the reading point on the document 2 is incident to the image information detector 5, the secondary light source effect is generated. On the other hand, in a case where the point 6 other than the reading point on the reading line 4 is black, as shown in FIG. 1B, even if a light is incident to the point 6, the light is not reflected by the point 6. In this case, the secondary light source effect is not generated. That is, even if the reading point on the document has a constant density, the image signal corresponding to the reading point obtained by the image information detector 5 varies in accordance with the density distribution in a region around the reading point.

FIG. 2A shows an image signal output from the image information detector 5 in a case where the image reading apparatus reads an image for one line in a wide white region on the document. FIG. 2B shows an image signal output from the image information detector 5 in a case where the image reading apparatus reads an image for one line across a 10 mm wide white band region surrounded by a black region. In FIGS. 2A and 2B, the axis of ordinates denotes a level (intensity) of the image signal and the axis of abscissas denotes a position of a pixel. When the image reading apparatus reads an image at a white point in the white region, the secondary light source effect is generated as has been described above. That is, the image signal shown in FIG. 2A includes a component corresponding to the secondary light source effect. On the other hand, when the image reading apparatus reads an image for one line across the white band region surrounded by the black region, the secondary light source effect is hardly generated on the reading line. That is, the image signal corresponding to each point in the white band region, shown in FIG. 2B, does not include a component corresponding to the secondary light source effect. Thus, a level (B) of the image signal corresponding to a white reading point shown in FIG. 2B is several percent less than a level (A) of the image signal corresponding to a white reading point shown in FIG. 2A. The level of the image signal corresponding to the white reading point decreases, for example, from the level (A) shown in FIG. 2A to the level (B) shown in FIG. 2B by 7.1% [=(A-B)/A x100].

Conventionally, to prevent the above secondary light source effect from being generated the following methods disclosed in Japanese Patent Laid-Open Publication Nos. 1-267531 and 1-221976 have been proposed.

In the method disclosed in Japanese Patent Laid-Open Publication No. 1-267531, a shading mechanism is provided adjacent to the supporting plate which supports the document so that a point other than the reading point on the document is not illuminated by the light source. In the method disclosed in Japanese Patent Laid-Open Publication No. 1-221976, a shading plate having a slit is provided between the light source and the supporting plate on which the document is set. Then a light emitted from the light source is projected via the slit on the shading plate onto a restricted region on the document.

However, in the above method disclosed in Japanese Patent Laid-Open Publication No. 1-267531, as the shading mechanism must be provided adjacent to the supporting plate, the cost for manufacturing the image reading apparatus increases. Further, as a part of the light directly illuminating the document is also shaded by the shading mechanism, the amount of light projected onto the reading point on the document is decreased, so that a signal-to-noise ratio of the image signal output from the image reading apparatus deteriorates and a reading speed has to be decreased. In addition, in the method disclosed in Japanese Patent Laid-Open Publication No. 1-221976, it is impossible to prevent the secondary light source effect from being generated on the reading line.

SUMMARY OF THE INVENTION

Accordingly, the general object of the present invention is to provide a novel and useful image signal processing method and apparatus in which the disadvantages of the aforementioned prior art are eliminated.

A more specific object of the present invention is to provide an image signal processing method and apparatus in which the influence of the secondary light source effect can be eliminated from an image signal without decreasing the amount of light which is projected onto the reading point on the document.

Another object of the present invention is to provide an image signal processing method and apparatus in which the influence of the secondary light source effect generated on the reading line can be eliminated from an image signal.

The above objects of the present invention are achieved by a method for processing an image signal generated in an image reading apparatus comprising light source means for illuminating a document, an optical system, and optical detecting means for detecting a light which is reflected at a reading point on the document and passes through the optical system and for outputting an image signal corresponding to an amount of light detected thereby, the method comprising the following steps (a) and (b) of: (a) obtaining a secondary light source effect function which describes a degree that a light reflected at each point other than the reading point on the document affects the image signal corresponding to the reading point, the secondary light source effect function being inherent in the image reading apparatus; and (b) correcting the image signal output from the optical detecting means based on the secondary light source effect function obtained by the step (a) and an image signal corresponding to each point so that a component corresponding to a light which is reflected at each point other than the reading point and affects the image signal corresponding to the reading point is eliminated from the image signal, whereby a corrected image signal is obtained by the step (b).

The above objects of the present invention are also achieved by an apparatus for processing an image signal generated in an image reading apparatus comprising light source means for illuminating a document, an optical system, and optical detecting means for detecting a light which is reflected at a reading point on the document and passes through the optical system and for outputting an image signal corresponding to an amount of light detected thereby, the apparatus comprising: storage means for storing a secondary light source effect function which describes a degree that a light reflected at each point other than the reading point on the document affects the image signal corresponding to the reading point, the secondary light source effect function being inherent in the image reading apparatus; correction means, coupled to the storage means, for correcting the image signal output from the optical detecting means based on the secondary light source effect function stored in the storage means and an image signal corresponding to each point so that a component corresponding to a light which is reflected at each point other than the reading point and affects the image signal corresponding to the reading point is eliminated from the image signal output from the optical detecting means, whereby a corrected image signal is output from the correction means.

According to the present invention, as the image signal is so corrected that the secondary light source effect is eliminated therefrom, it is unnecessary to provide devices for shading a light emitted from the light source, such as the conventional shading plate, for the image reading apparatus. Thus, it is possible to prevent the cost for manufacturing the image reading apparatus from increasing. In addition, the influence of the secondary light source effect generated on the reading line can also be eliminated from an image signal.

Additional objects, features and advantages of the present invention will become apparent from the following detailed description when read in conjunction with the accompanying drawings.

BRIEF DESCRIPTION OF THE DRAWINGS

FIG. 3 is a diagram illustrating an example of a the construction of an image reading apparatus;

FIG. 5 is a block diagram illustrating a first embodiment of a correcting circuit shown in FIG. 4;

DESCRIPTION OF THE PREFERRED EMBODIMENTS

Figure 1A:
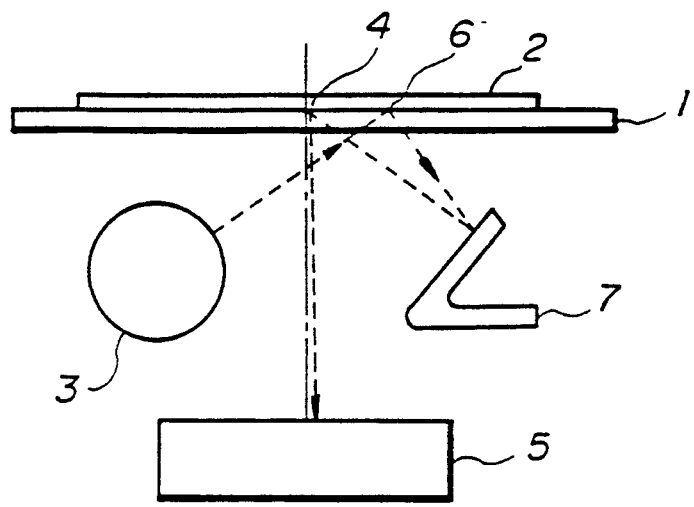
FIGS. 1A and 1B are diagrams illustrating a principle of the secondary light source effect.
Figure 1B:
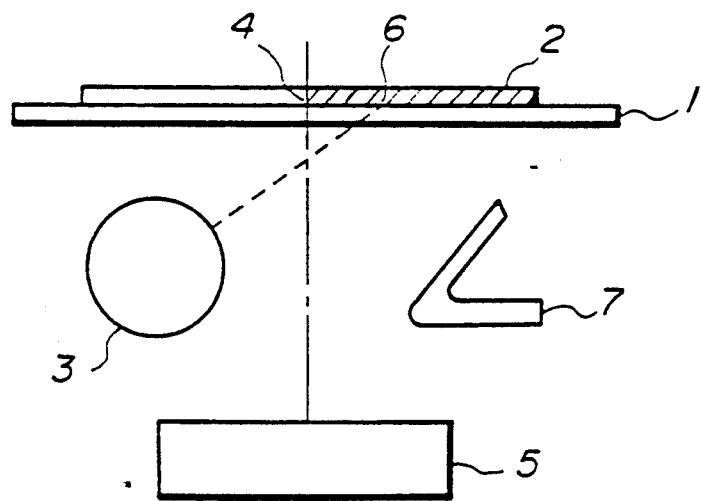
Figure 2B:
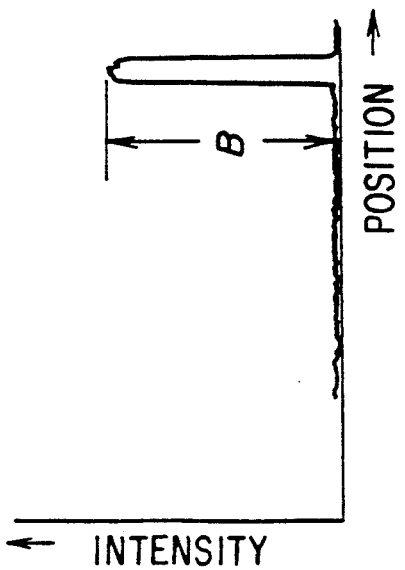
FIGS. 2A and 2B are signal wave form diagrams illustrating a variation of the level of the image signal due to the secondary light source effect.
Figure 2A:
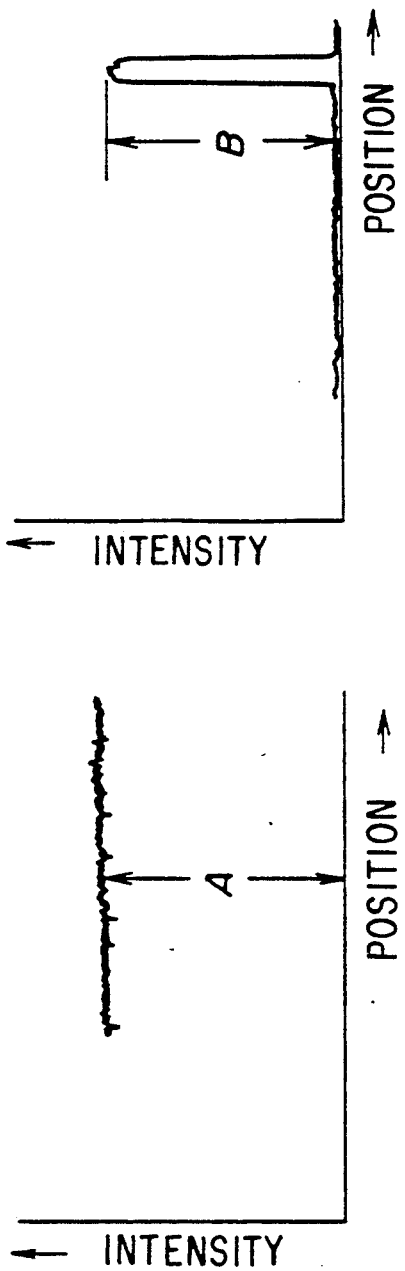

A description will now be given of the construction of an image reading apparatus according to the present invention with reference to FIG. 3.

Referring to FIG. 3, a document 2 is set on a supporting plate 1 which is transparent. The document 2 is illuminated via the supporting plate 1 by a light source 3 (a fluorescent lamp). A light reflected on each point (each reading point) on a reading line 4 is led to an image information detector 5 by an imaging optical system 8. The document 2 on the supporting plate 1 is scanned on the reading line 4 which continuously moves so that the image information detector 5 outputs an image signal corresponding to the whole document 2. In the image information detector 5, the image signal is corrected so as to eliminate the influence of the secondary light source effect therefrom.

The influence of the secondary light source effect is eliminated from the image signal in accordance with the following method.

In the image reading apparatus having the above structure, a reflectivity at a point (x,y) on the reading line 4 on the document 2 is denoted by $R(x,y)$. An illuminance at a point (x,y) on the reading line 4 under a first condition in which it is assumed that only a light emitted from the light source 3 is projected onto the point (x,y) on the reading line 4 is denoted by $I(x,y)$. An intensity of light reflected at a point (x,y) under the first condition is denoted by $P(x,y)$. An illuminance at a point (x,y) on the reading line 4 under a second condition in which the light source 3 illuminates the surface of the document 2 and the secondary light source effect affects the point (x,y) is denoted by I'(x,y). An intensity of light reflected at a point (x,y) on the reading line 4 under the second condition is denoted by P'(x,y). In addition, a degree that a light reflected at a point (x,y) on the document 2 affects a point $(x_1,y_1)$ on the reading line 4 is defined as a function S of a distance between the two points (x,y) and $(x_1,y_1)$ The function S is referred to as a secondary light source effect function and is denoted by $S(x_1-x, y_1-y)$.

The intensity $P'(x_1,y_1)$ of the light reflected at $(x_1,x_1)$ which is obtained under the above second condition is denoted by the following formula (1).

$$P'(x_1,y_1) = R(x_1,y_1) \cdot I'(x_1,y_1) \qquad (1)$$
$$= R(x_1,y_1) \cdot I(x_1,y_1) + \int\int S(|x_1 - x|, |y_1 - y|) \cdot R(x,y) \cdot I'(x,y) \cdot dx \cdot dy$$
$$= R(x_1,y_1) \cdot I(x_1,y_1) + \int\int S(|x_1 - x|, |y_1 - y|) \cdot P'(x,y) \cdot dx \cdot dy$$

Thus, when the above formula (1) is changed to the following formula (2), the intensity $P(x_1,y_1)$ of the light reflected at $(x_1,y_1)$ which is obtained under the above first condition is obtained.

$$P(x_1,y_1) = R(x_1,y_1) \cdot I(x_1,y_1) \qquad (2)$$
$$= P'(x_1,y_1) - \int\int S(|x_1 - x|, |y_1 - y|) \cdot P'(x,y) \cdot dx \cdot dy$$

In the above formula (2), the intensities $P'(x_1,y_1)$ and $P'(x,y)$ obtained under the second condition can be respectively detected by the image information detector 5. Then the second light source effect function $S(|x_1-x|,|y_1-y|)$ is inherent in an optical system of the image reading apparatus and can be experimentally obtained. That is, the component corresponding to the second light source effect is deleted from the image data $P'(x_1,y_1)$ eliminated at the point $(x_1,y_1)$ in accordance with the formula (2) so that the corrected image data $P(x_1,y_1)$ is obtained.

In the formula (2), the surface integral is carried out. But, to simplify an experiment for obtaining the secondary light source effect function and a calculation therefor, the corrected image data $P(x_1,y_1)$ can be obtained in accordance with the following calculation in which the integral is carried out in only two directions. For example, a first direction (x direction) parallel to the reading line 4 and a second direction (y direction) perpendicular to the first direction are defined as the two dimensions in which the integral is carried out.

$$P(x_1,y_1) = P'(x_1,y_1) \int S(x_1-x) \cdot P'(x,y_1) \cdot dx \qquad (3)$$
$$- \int S(y_1-y) \cdot P'(x_1,y) \cdot dy$$

In the formula (3), $S(|x_1-x|)$ and $S(|y_1-y|)$ respectively denote one dimensional secondary light source effect functions. The above formula (3) can be further simplified so that the following formula (4) is obtained.

$$P(x_1,y_1) = P'(x_1,y_1) - \int S(x_1-x) \cdot P'(x,y_1) \cdot dx \qquad (4)$$

According to the above formula (4), the secondary light source effect in one line is eliminated from the image data.

The one dimensional or two dimensional secondary light source function S is experimentally obtained, for example, as follows.

While a black picture is being brought up to a testing point on a white picture, a level of an image signal detected by the image reading apparatus at the testing point varies in accordance with the distance between the testing point and the black picture. Thus, the secondary light source effect function is obtained based on the variation of the level of the image signal detected at the testing point.

Figure 6A:
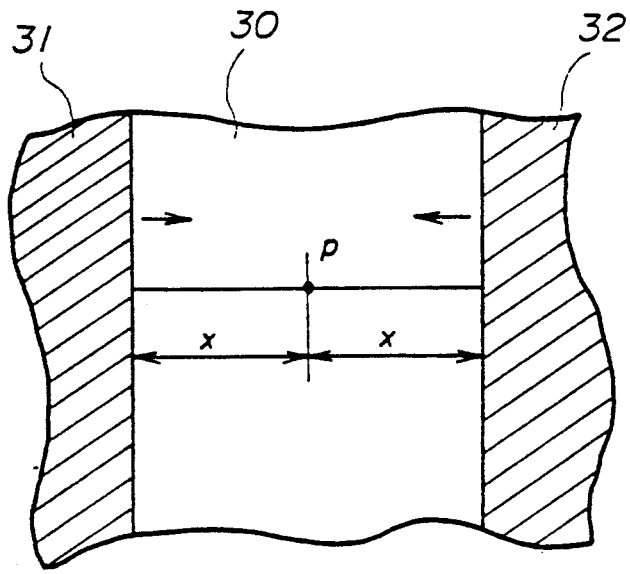
FIGS. 6A, 6B and 6C are diagrams illustrating a process for obtaining a function representing the secondary light source effect.
Figure 6B:
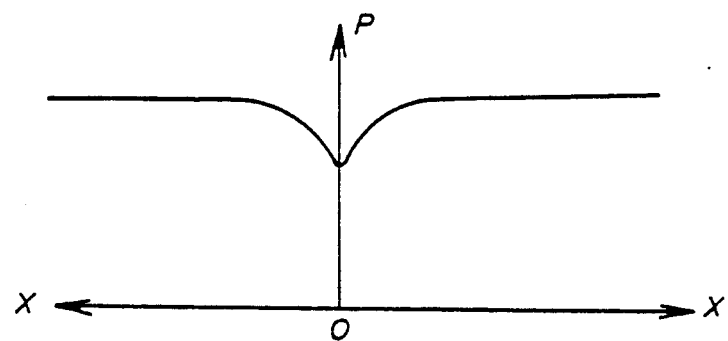
Figure 6C:
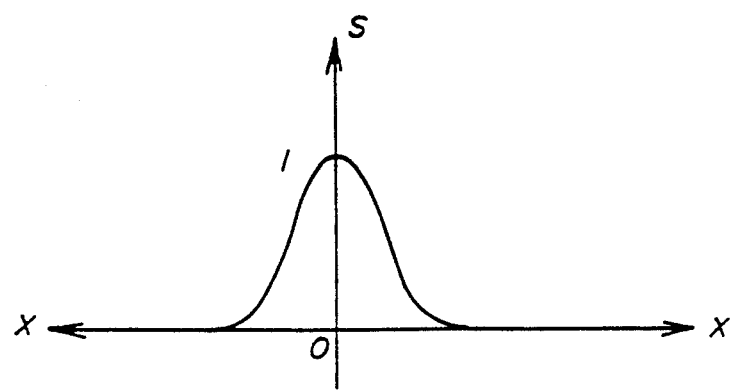

For example, in FIG. 6A black plates 31 and 32 are being brought up to a testing point (p) on the white reference document 30 set on the supporting plate 1 of the image reading apparatus. While this is occurring, the level of the image signal detected at the testing point (p) is sampled. As a result, a characteristic curve regarding the level P of the image signal and the distance x between the testing point (p) and an edge of each of the black plates 31 and 32 is obtained as shown in FIG. 6B. In FIG. 6B, as the secondary light source effect is small under a condition in which the black plates 31 and 32 are positioned near the testing point (p), the smaller the distance x, the lower the level P of the image signal becomes. Then, the characteristic curve shown in FIG. 6B is differentiated and normalized so that a value is equal to 1 at x=0. As a result, a function S shown in FIG. 6C is obtained. This function S is used as the secondary light source function described above.

In a case where the integral is carried out by a digital processing, the integral can be denoted by a format of a mathematical series. Thus, the following formula (5) can be substituted for the above formula (4).

$$P_i = P'_i - (S_{i1} \cdot P'_1 + \ldots + S_{ii-1} \cdot P'_{i-1} + \qquad (5)$$
$$S_{ii} \cdot P'_i + S_{ii+1} \cdot P'_{i+1} + \ldots + S_{in} \cdot P'_n)$$
$$= P'_i - \sum_{k=1}^{n} S_{ik} P'_k$$

In the above formula (5), the number of pixels in a reading line is n, and $P_i$ and $P'_i$ respectively denote $P(x_i,y_i)$ and $P,(x_i,y_i)$ at a pixel i on a reading line j in the above formula (4). The secondary light source effect function S can be defined for each of n pixels (points) in one reading line. Thus, when the secondary light source effect that m-th pixel affects i-th pixel is denoted by $S_{im}$, the secondary light source effect function can be denoted by a n×n matrix. As a result, the above formula (5) is rewritten in accordance with the following determinant (6).

$$\begin{bmatrix} P_1 \\ \cdot \\ \cdot \\ \cdot \\ P_n \end{bmatrix} = \begin{bmatrix} P'_1 \\ \cdot \\ \cdot \\ \cdot \\ P'_n \end{bmatrix} - \begin{bmatrix} S_{11} \ldots S_{1n} \\ \cdot \\ \cdot \\ S_{n1} \ldots S_{nn} \end{bmatrix} \cdot \begin{bmatrix} P'_1 \\ \cdot \\ \cdot \\ \cdot \\ P'_n \end{bmatrix} \qquad (6)$$

That is, the n×n matrix denoting the secondary light source effect is obtained, and then the corrected image data $P_i$ is calculated in accordance with the determinant (6).

The image information detector 5 shown in FIG. 3 includes, for example, an image signal processing circuit in which the calculating is carried out in accordance with the above determinant (6). The image signal processing circuit included in the image information detector 5 is formed, for example, as shown in FIG. 4.

Figure 4:
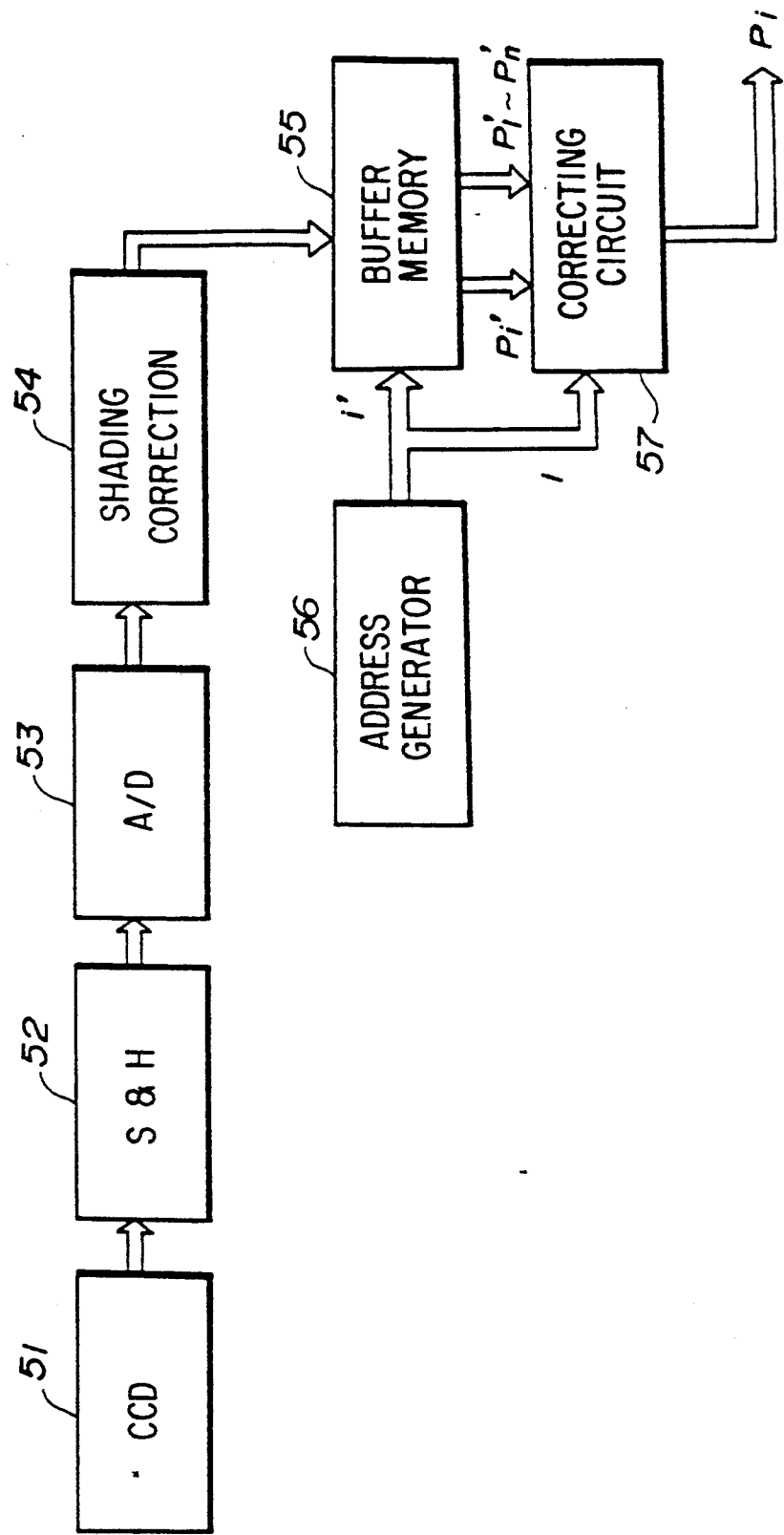
FIG. 4 is a block diagram illustrating a basic structure of the image processing apparatus according to the present invention.

Referring to FIG. 4, the image signal processing circuit has a CCD optical sensor 51, a sample and hold circuit 52, an analog to digital converter 53, a shading correction circuit 54, a buffer memory 55, an address generator 56 and a correcting circuit 57. The light traveling via the imaging optical system 8 is incident to the CCD optical sensor 51. The CCD optical sensor 51 outputs an image signal corresponding to the amount of light incident thereto. The image signal output from the CCD image sensor 51 is sampled and held by the sample and hold circuit 52 in synchronism with a predetermined clock signal, so that the sample and hold circuit 52 successively samples the image signal corresponding by every pixel. The analog to digital converter 53 converts the level (voltage) of the image signal into digital image data on each pixel. The shading correction circuit 54 carries out a shading correction with respect to the image data supplied from the analog to digital converter 53 based on predetermined white reference data on each pixel. The image data with respect to which the shading correction is carried out is supplied to the buffer memory 55. The buffer memory 55 stores, for example, the image data on one line. The address generator 56 outputs an address corresponding to the reading point i (pixel) in synchronism with a predetermined clock signal. The buffer memory 55 is accessed by the address supplied from the address generator 56 so that the image data $P_i'$ corresponding to a reading point i and n image data $P_1'-P_n'$ corresponding to pixels on one reading line are read out from the buffer memory 55. The correcting circuit 57 inputs the image data $P_i'$ corresponding to the reading point i and n image data $P'_1-P'_n$ corresponding to one reading line and calculates the corrected image data $P_i$ corresponding to the reading point i in accordance with the determinant (6).

The correction circuit 57 is formed, for example, as shown in FIG. 5.

Referring to FIG. 5, the correcting circuit 57 has a ROM 11 (read only memory), a multiplier 12, an adder 13 and a subtracter 14. The secondary light source effect function S denoted by a n×n matrix is stored in the ROM 11. When the address i corresponding to the reading point i is supplied from the address generator 56 to the ROM 11, coefficients $S_{i1}, S_{i2}, \ldots, S_{in}$ in the n×n matrix S denoting the secondary light source effect function S are successively output from the ROM 11. Then, the coefficients $S_{i1}, S_{i2}, \ldots, S_{in}$ and the n image data $P'_1-P'_n$ are successively supplied to the multiplier 12. The multiplier 12 multiples each image data $P'_k$ by a corresponding $S_{ik}$. The adder 13 successively adds each output data from the multiplier 12 so that the following calculation is carried out.

$$S_{i1} \cdot P'_1 + S_{i2} \cdot P'_2 + \ldots + S_{in} \cdot P'_n \quad (7)$$

The subtracter 14 subtracts the above calculation result output from the adder 13 from the image data $P'_i$ corresponding to the reading point i supplied from the buffer memory 55. Thus, the subtracter 14 outputs the following corrected image data $P_i$ corresponding to the reading point i.

$$P_i = P'_i - (S_{i1} \cdot P'_1 + S_{i2} \cdot P'_2 + \ldots + S_{in} \cdot P'_n) \quad (8)$$

When the above calculating has been repeatedly carried out with respect to all points in one reading line, the corrected image data $P_1-P_n$ on one reading line are obtained.

The image data $P'_i$ on each reading point is corrected by the correction circuit 57 so that the component $(S_{i1} \cdot P'_1 + S_{i2} \cdot P'_2 + \ldots + S_{in} \cdot P'_n)$ corresponding to the secondary light effect is eliminated from the image data $P'_i$. As a result, an image having a fine gradation can be formed based on the corrected image data Pi on each reading point.

In the above embodiment, each coefficient $S_{im}$ which denotes a degree that a light reflected on the m-th position (pixel) affects the i-th pixel is experimentally obtained. The secondary light source effect function is denoted by the n×n matrix S formed of each coefficient $S_{im}$. All coefficients in the n×n matrix S are stored in the ROM 11. As, in general, several thousands of pixels are arranged in one reading line, n is also a number equal to several thousands. Thus, it is required that the ROM 11 have a large capacity.

It is possible to assume that the degrees of secondary light source effect corresponding to respective positions on one reading line are substantially equal to each other. That is, the secondary light source functions corresponding to respective positions all have the same shape shown in FIG. 6C. Thus, in the n×n matrix denoting the secondary light source function S, coefficients on a diagonal line of the n×n matrix and those adjacent to it have predetermined values and other coefficients are 0.

Thus, due to using a coefficient string having n coefficients which denotes the second light source effect function corresponding to a specific point (pixel), as shown in FIG. 6C, the image data can be corrected so that the component corresponding to the second light source effect is eliminated therefrom. In this case, the capacity of the ROM in which data denoting the secondary light source effect function is stored can be decreased.

Figure 7:
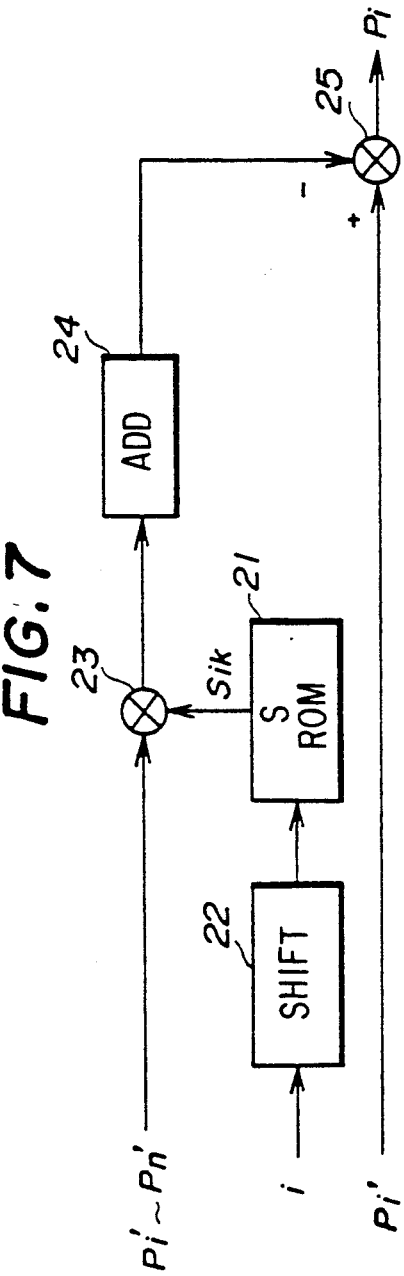
FIG. 7 is a block diagram illustrating a second embodiment of the correcting circuit shown in FIG. 4.

To correct the image data by using the n coefficients corresponding to the secondary light source effect function shown in FIG. 6C, the correcting circuit 57 is formed, for example, as shown in FIG. 7.

Figure 8:
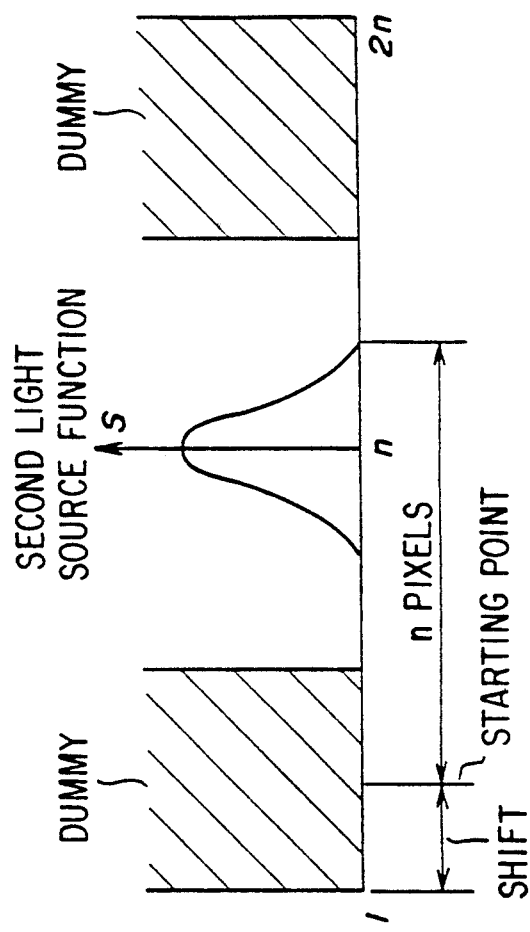
FIG. 8 is a diagram illustrating an operation in a shifting circuit shown in FIG. 7.

Referring to FIG. 7, the correcting circuit 57 has a ROM 21, a shifter 22, a multiplier 23, an adder 24 and a subtracter 25. The secondary light source effect function with respect to a specific point (pixel) has been experimentally obtained beforehand, as shown in FIGS. 6A, 6B and 6C. Then n coefficients corresponding to the secondary light source effect function S shown in FIG. 6C and n dummy data of "0" are stored in the ROM 21. That is, the 2n coefficients (including n dummy data) are arranged in the ROM 21, as shown in FIG. 8. When the address i corresponding to the reading point i is supplied from the address generator 56 to the shifter 22, the shifter 22 shifts the address i by a predetermined shift number s. The shift number s corresponds to a distance between the reading point i and the specific point at which the secondary light source effect function is measured. When the shifted address (i+s) is supplied from the shifter 22 to the ROM 21, n coefficients are successively read out from a starting point corresponding to the shifting number s in the ROM 21, as shown in FIG. 8. Thus, the n coefficients $S_{(i+s)1}, S_{(i+s)2}, \ldots, S_{(i+s)n}$ are supplied from the ROM 21 to the multiplier 23. The n image data $P'_1-P'_n$ on one reading line are also supplied to the multiplier 23, and then the multiplier 24 multiplies each image data $P'_k$ by a corresponding $S_{(i+s)k}$. The adder 24 successively adds each output data from the multiplier 23 so that the following calculation is carried out.

$$S_{(i+s)1} \cdot P'_1 + S_{(i+s)2} \cdot P'_2 + \ldots + S_{(i+s)n} \cdot P'_n \quad (9)$$

The subtracter 25 subtracts the above calculation result, which is output from the adder 24, from the image data $P'_i$ corresponding to the reading point i supplied from the buffer memory 55. Thus, the subtracter 25 outputs the following corrected image data $P_i$ corresponding to the reading point i $$P_i = P'_i - (S_{(i+s)1} \cdot P'_1 + S_{(i+s)2} \cdot P'_2 + \ldots + S_{(i+s)n} \cdot P'_n) \quad (8)$$

When the above calculation has been repeatedly carried out with respect to all points in one reading line, the corrected image data $P_1-P_n$ on one reading line are obtained.

According to the above correcting circuit 57, as the amount of information denoting the secondary light source effect function S is decreased, the capacity of the ROM 21 storing the secondary light source effect function can be decreased.

Figure 9:
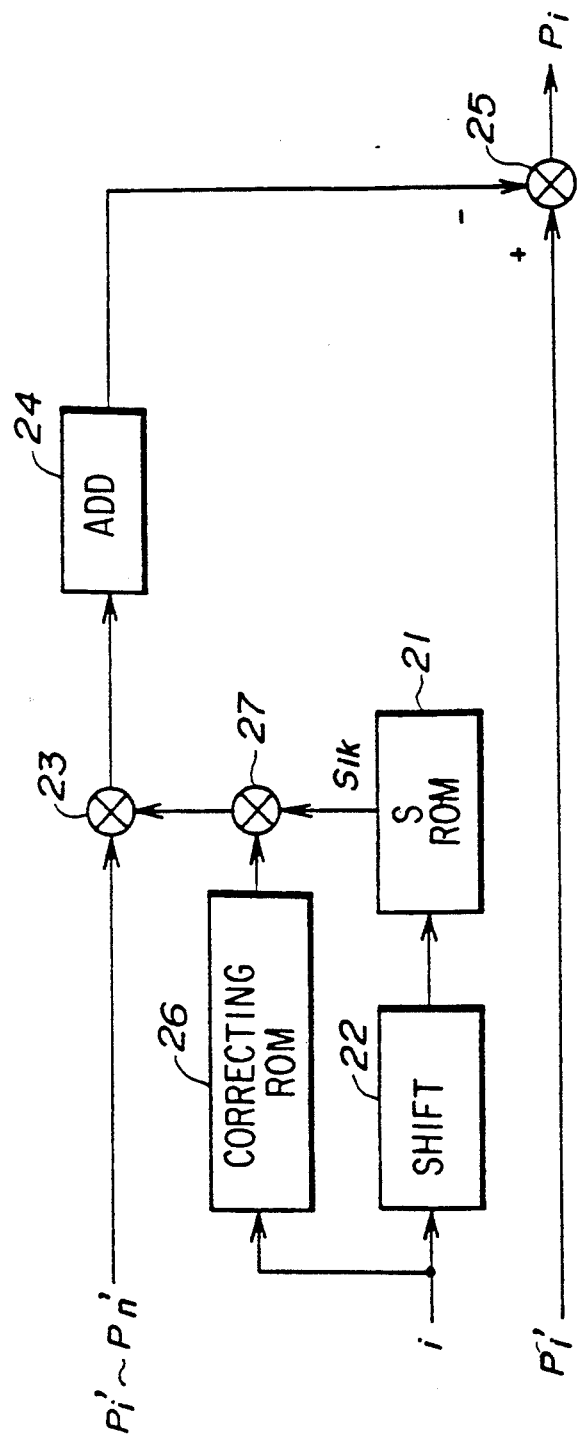
FIG. 9 is a block diagram illustrating a third embodiment of the correcting circuit shown in FIG. 4.

In the above embodiment shown in FIGS. 7 and 8, it is assumed that the degrees of secondary light source effect corresponding to respective points on one reading line are substantially equal to each other. However, actually the degrees of secondary light source effect corresponding to respective points differ from each other. Thus, in a case where the correcting circuit 57 is formed as shown in FIG. 9, the image data can be corrected even more accurately. In FIG. 9, those parts which are the same as those shown in FIG. 7 are given the same reference numbers.

Referring to FIG. 9, the correcting circuit has the ROM 21, the shifter 22, the multiplier 23, the adder 24 and the subtracter 25 in the same manner as that shown in FIG. 7. This correcting circuit also has a correcting ROM 26 and a multiplier 27. The correcting ROM 26 stores a correcting coefficient corresponding to each point (pixel). The correcting coefficient is determined based on a difference between a secondary light source effect at each point and the secondary light source effect described by n coefficients stored in the ROM 21. When the address i is supplied from the address generator 55 to the shifter 22 and the ROM 26, the n coefficients are successively output from the ROM 21 in the same manner as those in the case shown in FIG. 7, and the correcting coefficient corresponding to each point i is read out from the ROM 26. Then the multiplier 27 multiplies each coefficient from the ROM 21 by a corresponding correcting coefficient so that a corrected coefficient representing the secondary light source effect function corresponding to each point i is output therefrom. After that, due to the operations of the multiplier 23, the adder 24 and the subtracter 25, the corrected image data $P_i$ is obtained in the same manner as that in the case shown in FIG. 7.

In the correcting circuit 57 shown in FIG. 9, each coefficient representing the secondary light source effect function corresponding to the specific point (pixel) is corrected based on the correcting coefficient corresponding to each point so that the corrected coefficient represents the secondary light source effect function corresponding to each point. Thus, the image data can be more accurately corrected by the correcting circuit shown in FIG. 9 than by the correcting circuit shown in FIG. 7.

In the above embodiments, the image data is corrected based on the formula (4). However, the image data can also be corrected based on either formula (2) or (3) in the same manner as in the case of the formula (4).

The image data on a plurality of reading lines can be stored in the buffer memory 55. In this case, the document 2 is continuously scanned so that the image data on the plurality of reading lines are stored in the buffer memory 55, and then the correcting circuit 57 successively carries out the correction process for eliminating the secondary light source effect from each image data.

The present invention is not limited to the aforementioned embodiments, and variations and modifications may be made without departing from the scope of the claimed invention.

What is claimed is:

1. A method for processing an image signal generated in an image reading apparatus comprising light source means for illuminating a document, an optical system, and optical detecting means for detecting a light which is reflected at a reading point on the document and passes through said optical system and for outputting an image signal corresponding to an amount of light detected thereby, said method comprising the following steps (a) and (b) of:

(a) obtaining a secondary light source effect function which describes a degree that a light reflected at each point other than the reading point on the document affects the image signal corresponding to the reading point, said secondary light source effect function being inherent in said image reading apparatus, wherein said step of obtaining the secondary light source function comprises the steps of:

(a-1) moving black plates up to a reading point on a white document having a predetermined white density;

(a-2) obtaining an image signal output from said optical detecting means in said image reading apparatus while said step (a-1) is being carried out; and (a-3) generating the secondary light source effect function based on a variation of the image signal obtained by said step (a-2); and (b) correcting the image signal output from said optical detecting means based on said secondary light source effect function obtained by said step (a) and an image signal corresponding to each point so that a component corresponding to the light which is reflected at each point other than the reading point and affects the image signal corresponding to the reading point is eliminated from the image signal, whereby a corrected image signal is obtained by said step (b).

2. A method as claimed in claim 1, wherein said step (b) comprises the following steps (b-1) and (b-2) of:

(b-1) calculating the component corresponding to the light which is reflected at each point other than the reading point and affects the image signal corresponding to the reading point based on said secondary light source effect function and an image signal corresponding to each point other than the reading point; and (b-2) eliminating the component calculated by said step (b-1) from the image signal corresponding to the reading point, so that the corrected image signal is obtained.

3. A method as claimed in claim 2, wherein said step (b-1) calculates the component based on the secondary light source effect function and an image signal corresponding to each point on a first line on which the reading point is set.

4. A method as claimed in claim 2, wherein said step (b-1) calculates the component based on the secondary light source effect function and an image signal corresponding to each point on a first line in a first direction and a second line in a second direction, the first line and the second line being perpendicular to each other and crossing each other at the reading point.

5. A method as claimed in claim 1, wherein said optical detecting means detects a light reflected at a reading point while the reading point is being moved in a predetermined direction, and wherein said step (a) includes a step of obtaining a secondary light source effect function which describes a degree that a light reflected at each point on the document affects the image signal corresponding to a specific point, and said step (b) includes the following steps (b-3) through (b-5) of;

(b-3) correcting a secondary light source function obtained by said step (a) based on a distance between the specific point and a reading point on the document so that a corrected secondary light source function which describes a degree that a light reflected at each point on the document affects the image signal corresponding to the reading point is obtained, (b-4) calculating the component corresponding to the light which is reflected at each point and affects the image signal corresponding to the reading point based on said secondary light source effect function corrected by said step (b-1) and an image signal corresponding to each point other than the reading point; and (b-5) eliminating the component calculated by said step (b-4) from the image signal corresponding to the reading point, so that the corrected image signal is obtained.

6. An apparatus for processing an image signal generated in an image reading apparatus comprising light source means for illuminating a document, an optical system, and optical detecting means for detecting a light which is reflected at a reading point on the document and passes through said optical system and for outputting an image signal corresponding to an amount of light detected thereby, said apparatus comprising:

storage means for storing a secondary light source effect function which describes a degree that a light reflected at each point other than the reading point on the document affects the image signal corresponding to the reading point, said secondary light source effect function being inherent in said image reading apparatus, wherein said secondary light source is obtained by:

moving black plates up to a reading point on a white document having a predetermined white density;

obtaining an image signal output from said optical detecting means in said image reading apparatus while said black plates are being moved up to the reading point; and generating the secondary light source effect function based on a variation of the obtained image signal;

correction means, coupled to said storage means, for correcting the image signal output from said optical detecting means based on said secondary light source effect function stored in said storage means and an image signal corresponding to each point so that a component corresponding to a light which is reflected at each point other than the reading point and affects the image signal corresponding to the reading point is eliminated from the image signal output from the optical detecting means, whereby a corrected image signal is output from said correction means.

7. An apparatus as claimed in claim 6, wherein said correction means comprises:

first means for calculating the component corresponding to the light which is reflected at each point other than the reading point and affects the image signal corresponding to the reading point based on said secondary light source effect function stored in said storage means and an image signal corresponding to each point other than the reading point; and second means for eliminating the component calculated by said first means from the image signal corresponding to the reading point, so that the corrected image signal is obtained.

8. An apparatus as claimed in claim 7, wherein said storage means stores the secondary light source effect function which describes a degree that a light reflected at each point on one line on which the reading point is set affects the image signal, so that said first means calculates the component based on the secondary light source effect function stored in said storage means and an image signal corresponding to each point on the one line.

9. An apparatus as claimed in claim 6, wherein said optical detecting means detects a light reflected at a reading point while the reading point is being moved in a predetermined direction, and wherein said storage means stores a secondary light source effect function which describes a degree that a light reflected at each point on the document affects the image signal corresponding to a specific point, and wherein said correction means includes:

first means for correcting the secondary light source effect function stored in said storage means based on a distance between the specific point and a recording point on the document so that a corrected secondary light source function which describes a degree that a light reflected at each point on the document affects the image signal corresponding to the reading point is obtained;

second means for calculating the component corresponding to the light which is reflected at each point other than the reading point and affects the image signal corresponding to the reading point based on said corrected secondary light source effect function stored in said storage means and an image signal corresponding to each point other than the reading point; and third means for eliminating the component calculated by said second means from the image signal corresponding to the reading point, so that the corrected image signal is obtained.

* * * * *